United States Patent
Kim et al.

(10) Patent No.: US 10,638,307 B2
(45) Date of Patent: *Apr. 28, 2020

(54) METHOD AND APPARATUS FOR SENDING AND RECEIVING MULTI-CARRIER INFORMATION IN MULTI-CARRIER COMMUNICATION SYSTEM

(71) Applicant: LG ELECTRONICS INC., Seoul (KR)

(72) Inventors: Yong Ho Kim, Anyang-si (KR); Ki Seon Ryu, Anyang-si (KR); Young Soo Yuk, Anyang-si (KR); Jeong Ki Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,949

(22) Filed: Jul. 8, 2019

(65) Prior Publication Data

US 2019/0335321 A1   Oct. 31, 2019

Related U.S. Application Data

(63) Continuation of application No. 15/466,184, filed on Mar. 22, 2017, now Pat. No. 10,368,234, which is a
(Continued)

(51) Int. Cl.
*H04W 8/24* (2009.01)
*H04L 5/00* (2006.01)
*H04W 72/04* (2009.01)

(52) U.S. Cl.
CPC ............. *H04W 8/24* (2013.01); *H04L 5/0007* (2013.01); *H04L 5/0037* (2013.01);
(Continued)

(58) Field of Classification Search
CPC ... H04W 8/24; H04W 72/04; H04W 72/0413; H04W 72/0453; H04L 5/0007; H04L 5/0037; H04L 5/0092; H04L 5/0094
(Continued)

(56) References Cited

U.S. PATENT DOCUMENTS

2005/0195910 A1   9/2005   Kim et al.
2006/0084404 A1   4/2006   Laroia et al.
(Continued)

OTHER PUBLICATIONS

Etemad et al., "Updated Proposal for Generalized Multi-Carrier Support in IEEE 802.16m Systems," IEEE 802.16 Broadband Wireless Access Working Group <http://ieee802.org/16>, C80216m-08/401r1, May 5, 2008, 12 pages.
Yuk et al., "Procedures for Multicarrier Support," IEEE 802.16 Broadband Wireless Access Working Group, IEEE C802.16m-08/1160r1, Sep. 9, 2008, pp. 1-7.

*Primary Examiner* — Obaidul Huq
(74) *Attorney, Agent, or Firm* — Birch, Stewart, Kolasch & Birch, LLP

(57) ABSTRACT

A method for operating a plurality of carriers by a first base station in a wireless communication system supporting a primary carrier and at least one secondary carrier is discussed. The method includes transmitting, to a user equipment through the primary carrier, control information for exchanging traffic via the at least one secondary carrier with the user equipment; transmitting, to the user equipment, the traffic through the secondary carrier, wherein the user equipment is configured to receive the traffic based on the control information; and transmitting, to the user equipment, a message for a procedure of an entrance to a second base station. Further, the primary carrier is changed on the procedure of the entrance based on the message.

12 Claims, 5 Drawing Sheets

Related U.S. Application Data continuation of application No. 14/248,106, filed on Apr. 8, 2014, now Pat. No. 9,628,984, which is a continuation of application No. 13/124,087, filed as application No. PCT/KR2009/005945 on Oct. 15, 2009, now Pat. No. 8,724,565.

(60) Provisional application No. 61/105,434, filed on Oct. 15, 2008.

(52) U.S. Cl.
CPC .......... *H04L 5/0092* (2013.01); *H04L 5/0094* (2013.01); *H04W 72/04* (2013.01); *H04W 72/0413* (2013.01); *H04W 72/0453* (2013.01)

(58) Field of Classification Search
USPC ........................................ 370/310, 328, 329
See application file for complete search history.

(56) References Cited

U.S. PATENT DOCUMENTS

| | | | |
|---|---|---|---|
| 2007/0071067 A1 | 3/2007 | Kwong et al. | |
| 2008/0232316 A1 | 9/2008 | Cho et al. | |
| 2008/0242340 A1 | 10/2008 | Kang et al. | |
| 2008/0287068 A1 | 11/2008 | Etemad | |
| 2009/0274096 A1 | 11/2009 | Fu | |
| 2009/0310563 A1 | 12/2009 | Chou et al. | |
| 2010/0027481 A1 | 2/2010 | Lindh et al. | |
| 2010/0056202 A1 | 3/2010 | Li et al. | |
| 2012/0026958 A1 | 2/2012 | Chou | |
| 2013/0182685 A1* | 7/2013 | Yu ...................... | H04W 72/087 370/336 |

* cited by examiner

METHOD AND APPARATUS FOR SENDING AND RECEIVING MULTI-CARRIER INFORMATION IN MULTI-CARRIER COMMUNICATION SYSTEM

CROSS-REFERENCE TO RELATED APPLICATIONS

This application is a Continuation of U.S. patent application Ser. No. 15/466,184 filed on Mar. 22, 2017, which is a Continuation of U.S. patent application Ser. No. 14/248,106 filed on Apr. 8, 2014 (now U.S. Pat. No. 9,628,984 issued on Apr. 18, 2017), which is a Continuation of U.S. patent application Ser. No. 13/124,087 filed on May 16, 2011 (now U.S. Pat. No. 8,724,565 issued on May 13, 2014), which is the National Phase of PCT International Application No. PCT/KR2009/005945 filed on Oct. 15, 2009, which claims the priority benefit under 35 U.S.C. § 119(e) to U.S. Provisional Application No. 61/105,434 filed on Oct. 15, 2008, all of which are hereby expressly incorporated by reference into the present application.

BACKGROUND OF THE INVENTION

Field of the Invention

This specification relates to a multi-carrier communication system, and more particularly, a method and apparatus for sending and receiving multi-carrier system information for multi-carrier operations.

Discussion of the Related Art

As communication technologies develop, services provided in a mobile communication system are developing into various types of services, such as a packet data transmission/reception service for sending large capacity data, a multimedia broadcast service and the like, as well as a voice communication service.

The third generation communication services, such as WCDMA and the like, which are currently being provided, support transmission of not only voice but also large capacity image and data at a high transmission rate. In addition, standardization of Long-Term Evolution Network (LTE), Institute of Electrical and Electronics Engineers (IEEE) 802.16m and the like are actively undergoing in order to construct an evolved network having a wider bandwidth, considering that data traffic will be remarkably increased later.

IEEE802.16m, for which the standardization is in progress, aims to development of a standard, which meets IMT-advanced system requirements with maintaining compatibility with the existing 802.16 standard-based terminal and base station equipment. First of all, the IMT-advanced system requires provisions for broadband communication services over 40 MHz. So, in order to satisfy the requirements of the IMT-advanced system, IEEE802.16m has to be able to support such broadband communications. However, standard definition for every bandwidth is substantially difficult. Hence, a communication system using a multi-carrier, which is supposed to support a broadband using a plurality of carriers, is being discussed. The multi-carrier type system, which is being discussed in IEEE802.16m, allows a terminal and a base station to simultaneously access at least two frequency assignments (FAs) and perform data transmission and reception therebetween. Accordingly, the multi-carrier type system has an advantage of a high-speed transmission and reception of large capacity data, as compared to the existing single-carrier type. Also, communications can be carried out with using a broader bandwidth depending on situations from the perspective of the terminal (Mobile Station, MS), while more users can be covered from the perspective of the base station (BS).

The system supporting the multi-carrier can operate both in a single mode of performing communications using a single carrier and in a multi-mode of performing communications using a plurality of carriers. For the multi-mode operation, system information related to whether to support a multi-carrier operation and carrier allocation should be exchanged between a base station and a terminal.

However, at present, any detailed description of the multi-carrier system has not been given. Furthermore, several problems may occur when the multi-carrier system information providing method is performed according to the same manner as the related art system information providing method in the single mode.

SUMMARY OF THE INVENTION

Therefore, an object of the present invention is to provide a method for efficiently sending and receiving multi-carrier related system information in a system, which supports multi-carrier operations.

To achieve these and other advantages and in accordance with the purpose of the present disclosure, as embodied and broadly described herein, there is provided a method for sending and receiving multi-carrier information, the method including sending by a base station system information to the terminal via a broadcast message, the system information regarding multi-carriers that the base station is able to support, receiving a unicast message from the terminal, the unicast message including information related to carriers that the terminal is able to support or prefers in the multi-carrier list included in the system information, and sending multi-carrier allocation information including a primary carrier and a second carrier that the terminal will use, to the terminal via a unicast message.

Preferably, in the method for sending and receiving the multi-carrier information, the primary carrier may be a carrier capable of sending and receiving data traffic and Physical layer (PHY)/Medium Access Control (MAC) control information between the terminal and the base station, and the secondary carrier may be a carrier capable of sending and receiving a downlink data traffic between the terminal and the base station.

Preferably, in the method for sending and receiving the multi-carrier information, the broadcast message may be an Additional Broadcast Information (ABI) message receivable by the terminal during or even after a network entry procedure.

Preferably, in the method for sending and receiving the multi-carrier information, the system information may include information indicating whether or not the base station supports multi-carrier operations, information related to the number of carriers supported by the base station, index information related to each carrier, type information related to each carrier, center frequency information related to each carrier and bandwidth information related to each carrier.

Also, in the system information, the center frequency information related to each carrier may indicate a relative position of the corresponding carrier expressed as a bit value, based on a center frequency of a carrier currently accessed to the system.

Preferably, in the method for sending and receiving the multi-carrier information, the unicast message received from the terminal may include the carrier information that the terminal is able to support or prefers as an index value or in a bitmap form.

Preferably, in the method for sending and receiving the multi-carrier information, the unicast message sent to the terminal may include information related to the primary and secondary carriers that the terminal will use, as an index value or in a bitmap form.

To achieve the object of this specification in accordance with one exemplary embodiment, a method for sending and receiving multi-carrier information in a terminal supporting the multi-carrier may include receiving system information from a base station via a broadcast message, the system information regarding multi-carriers that the base station is able to support, configuring carrier information that the terminal is able to support or prefers in the multi-carrier list included in the system information, as an index value or in a bitmap form, sending the carrier information configured as the index value or in the bitmap form to the base station via a unicast message, and receiving multi-carrier allocation information including a primary carrier and a secondary carrier from the base station via a unicast message.

Preferably, in the method for sending and receiving the multi-carrier information, the system information may include information indicating whether or not the base station supports multi-carrier operations, information related to the number of carriers supported by the base station, index information related to each carrier, type information related to each carrier, center frequency information related to each carrier and bandwidth information related to each carrier.

Preferably, in the method for sending and receiving the multi-carrier information, the unicast message sent to the base station may further include information indicating whether or not the terminal supports multi-carrier operations, information related to the number of carriers supported by the terminal and index information related to each carrier.

Preferably, in the method for sending and receiving the multi-carrier information, the unicast message received from the base station may include the information related to the primary and secondary carriers that the terminal will use, as an index value or in a bitmap form.

In accordance with the detailed description, in a system supporting a multi-carrier, a broadcast message and a unicast message may be appropriately used to send multi-carrier related information, resulting in an effect of dispersing overheads of a broadcast channel and a unicast channel.

Also, frequency information related to a plurality of carriers can be sent by being expressed as relative position values, thereby reducing an amount of control information.

DETAILED DESCRIPTION OF THE EMBODIMENTS

Figure 1:
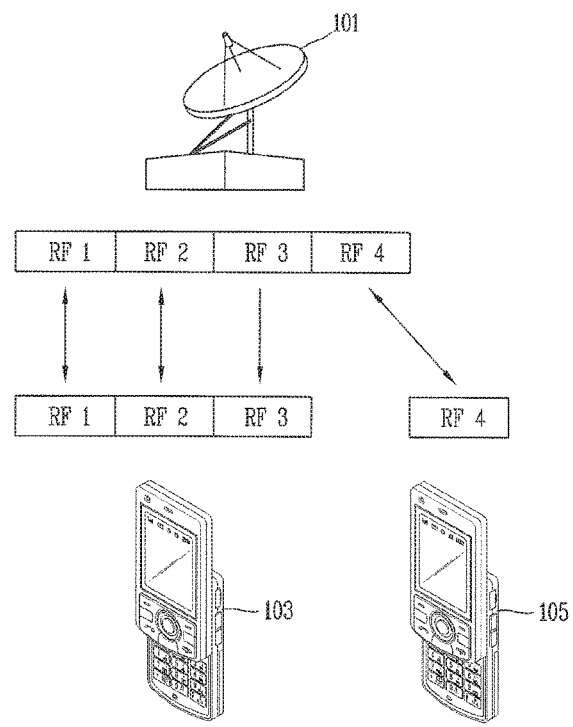
FIG. 1 is a view illustrating a multi-carrier system in accordance with one exemplary embodiment.

Reference will now be made in detail to the preferred embodiments of this specification with reference to the accompanying drawings. The same/like components irrespective of reference numerals will have the same reference numerals and repeated description thereof will be omitted. If it is determined that detailed description of a related well-known technology makes the point of this specification obscure, the detailed description will be omitted. Also, the accompanying drawings are merely given to help easy understanding of the scope of the present disclosure, and it should be noticed that the accompanying drawings should not be construed to limit the scope of the present disclosure.

Hereinafter, the term 'terminal' used herein may be replaced with Subscriber Station (SS), User Equipment (UE), Mobile Equipment (ME) and Mobile Station (MS). Also, the terminal may be a portable device having a communication function, such as a Personal Digital Assistant (PDA), smart phone, a laptop computer and the like, or a non-portable device, such as a Personal Computer (PC), a vehicle mounted apparatus and the like.

FIG. 1 is a view schematically illustrating a multi-carrier system in accordance with one exemplary embodiment.

As shown in FIG. 1, in a multi-carrier mode as illustrated in this specification, at least two carriers may be allocated to terminals 103 and 105 by a base station 1 so as to be used for data transmission and reception and the like. For the sake of explanation, an exemplary embodiment using four carriers RF1, RF2, RF3 and RF4 is illustrated hereinafter. The base station 101 may allocate a plurality of carriers RF1, RF2 and RF3 to the terminal 103, which can thus use them in a multi-carrier mode, and the carrier RF4 to the another terminal 105. Here, the first terminal 103 uses at least one carrier so as to operate in a multi-mode, and the second terminal 105 uses the single carrier so as to operate a single mode.

The base station 101 may divide types of multi-carriers into a fully configured carrier type and a partially configured carrier type. The fully configured carrier may be defined as a carrier capable of sending and receiving uplink/downlink data and physical layer (PHY)/medium access control (MAC) control information, and the partially configured carrier may be defined as a carrier capable of sending downlink data and minimum control information.

Referring to FIG. 1, RF1 and RF2 of the carriers allocated to the first terminal 103 correspond to the fully configured carriers, which allow for transmission and reception of uplink/downlink data and terminal-related PHY/MAC control information. RF3 allocated to the first terminal 103 corresponds to a partially configured carrier, which allows for transmission and reception of downlink data and part of control information related to the data transmission. RF4 allocated to the second terminal 105 corresponds to a fully configured carrier, which allows for uplink/downlink data transmission and reception and terminal-related PHY/MAC control information. A single mode type terminal such as the second terminal 105 may be allocated with only one carrier RF4. Hence, RF4 may preferably be a fully configured carrier type.

From the perspective of the terminals 103 and 105, the types of carriers allocated from the base station 101 may be divided into a primary carrier and a secondary carrier. Preferably, a terminal may be allocated with one primary carrier and a plurality of secondary carriers from a base station. In this specification, the primary carrier may be used for transmission and reception of data traffic and PHY/MAC control information between a terminal and a base station, and function as a carrier, which is generally used for a control function, such as a network entry of the terminal. Also, the secondary carrier may further be allocated to a terminal according to a request of the terminal or a resource allocation command of the base station, and be typically used as a carrier for transmission and reception of data traffic.

Still referring to FIG. 1, RF1 or RF2 allocated to the terminal 103 may be a primary carrier, and RF3 may be a secondary carrier. Similarly, RF4 allocated to the terminal 105 may serve as a primary carrier. As illustrated in FIG. 1, the multi-carrier system can support simultaneously both the terminal 103 supporting the multi-carrier and the terminal 105 supporting the single carrier. Also, the multi-mode terminal 103 supporting the multi-carrier may operate in the single mode using only a single carrier depending on data traffic. However, irrespective of operating in the multi-mode or the single mode, at least one carrier should be allocated to a terminal, and when only one carrier is allocated, the corresponding carrier functions as a primary carrier.

The primary carrier of a terminal is a fully configured carrier defined in a base station. A carrier, which performs an initial network entry procedure, is designated as the primary carrier. The secondary carrier may be set to a fully configured carrier or a partially configured carrier, and further be allocated according to request or instruction of a terminal or base station. Preferably, a terminal may send and receive every control information and information related to the secondary carrier via the primary carrier, and generally receive information related to transmission and reception of downlink data via the secondary carrier.

Figure 2:
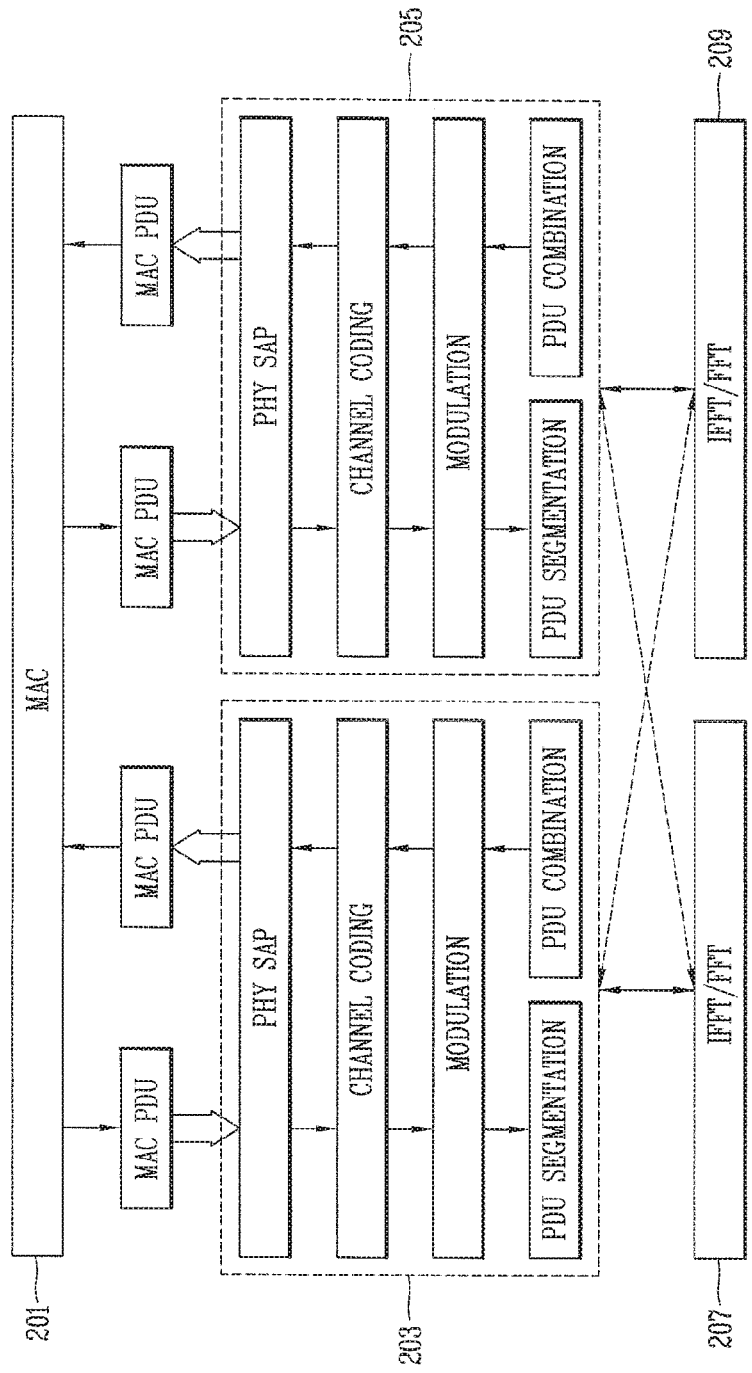
FIG. 2 is a view schematically illustrating an architecture of PHY/MAC layer in the multi-carrier system in accordance with the one exemplary embodiment.

FIG. 2 is a view schematically illustrating an architecture of a PHY/MAC layer in the multi-carrier system in accordance with the one exemplary embodiment.

As illustrated, the multi-carrier system may be configured such that one common Medium Access Control (MAC) 201 is cooperative with a plurality of carriers 207 and 209 via physical layers (PHYs) 203 and 205.

One Protocol Data Unit (PDU) as a basic data unit generated in a MAC end is transferred to each of the PHYs 203 and 205 via physical layer service access points (PHY SAPs). A channel coding and modulation process is performed at the PHYs 203 and 205, and symbol sequences of the modulated PHY PDUs are sent to a receiving end via Radio Frequency (RF) carriers 207 and 209.

Here, MAC PDU may be sent via a single carrier. However, for transmission efficiency, the MAC PDU may be segmented to be sent via a plurality of carriers. The dotted lines in FIG. 2 indicate a structure that data generated from one MAC PDU undergoes the channel coding and modulation process at the PHYs and is segmented to be then transmitted via two separate carriers. PDU segmentation/concatenation at a PHY end corresponds to a section for performing the segmentation/concatenation of one MAC PDU.

Figure 3:
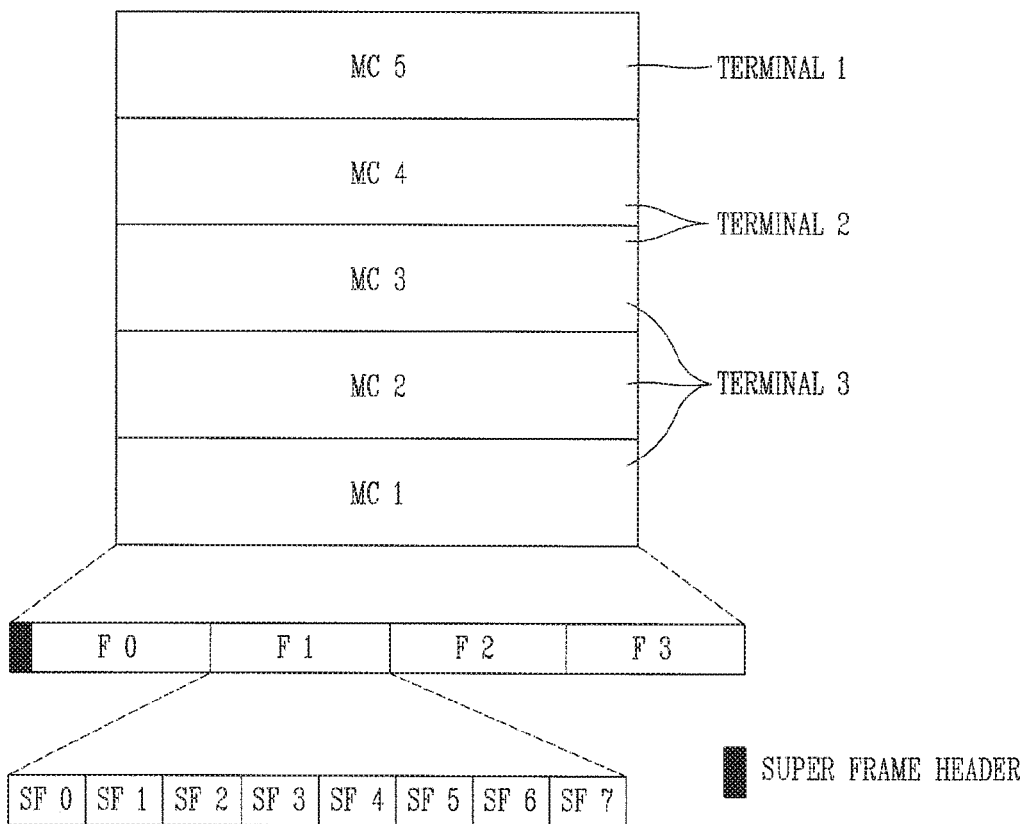
FIG. 3 is a view schematically illustrating a frame structure in the multi-carrier system.

FIG. 3 is a view schematically illustrating a frame structure of a system supporting the multi-carrier mode.

A frame structure of each carrier in the multi-carrier system is basically the same as the frame structure of the system supporting the single carrier. FIG. 3 illustrates supporting of both a single mode terminal and a multi-mode terminal by one frame structure.

The frame structure transferred via one carrier may include a frame of 5 ms as a basic element, and the frame may correspond to a basic single transmission unit.

The frame may include a plurality of transmission time intervals (TTI) each having a different size. The TTI is a basic unit of scheduling performed at a medium access control (MAC) layer. The TTI may be a radio resource allocation unit. The frame may include at least one subframe whose size depends on the number of symbols. Also, a superframe is configured with a plurality of frames. The superframe may be configured in the unit of, for example, 20 ms. When a superframe is configured, system configuration information and broadcast information for an initial fast cell selection and low latency service are set as a transmission unit, and in general, two to six frames form a single superframe. In addition, each frame in the unit of 5 ms includes a plurality of subframes, and each subframe includes a plurality of OFDM/OFDMA symbols. Each superframe includes a single superframe header (SFH) including a broadcast channel, and the SFH is positioned at a first subframe of the corresponding superframe.

In general, each terminal may be controlled by one carrier defined as a primary carrier. When a multi-carrier operation is supported, one or more secondary carriers may be allocated. For example, a terminal 1 has only one allocated carrier MC5 so as to operate in a single mode, and a terminal 2 has two allocated carriers MC3 and MC4 and a terminal 3 has three allocated carriers MC1, MC2 and MC3, so they operate in a multi-mode. Hence, for the terminal 2 and the terminal 3, one or more narrow bandwidth carriers may be concatenated to support broadband multi-carrier operations.

Figure 4:
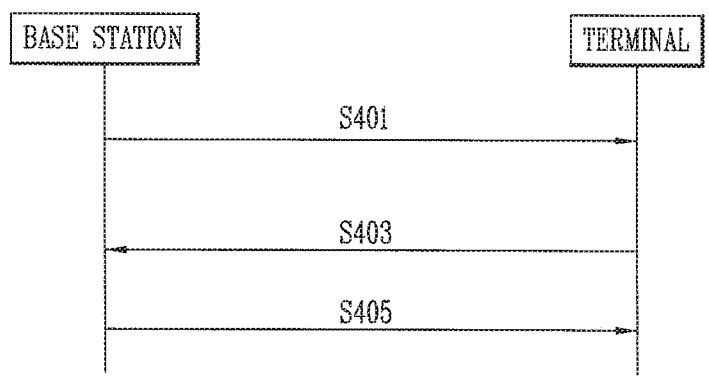
FIG. 4 is a view illustrating a process of sending and receiving multi-carrier system information for multi-carrier mode operations between a base station and a terminal.

FIG. 4 illustrates a procedure of sending and receiving multi-carrier system information for multi-carrier mode operations between a base station and a terminal in accordance with one exemplary embodiment.

The base station sends system information related to multi-carriers, which it is able to support, to the terminal (S401).

Methods of sending the multi-carrier related information from the base station to the terminal may include a method using a broadcast message and a method using a unicast message.

When the base station sends the system information to the terminal using a broadcast message, the base station may use a fixed downlink control channel, such as a Super Frame Header (SFH) or a Broadcast Channel (BCH), or a burst downlink broadcast message, such as an Additional Broadcast Information (ABI) message or a broadcast MAC management message. The SFH may be used when the terminal performs a network entry and sent to a physically fixed position, and accordingly have limitations of types of information to be sent. The ABI can be received during or even after the network entry of the terminal, and sent to the terminal in a burst form. The multi-carrier allocation in the multi-carrier system may be performed during or even after the network entry. Hence, it is preferable to send system information to the terminal by using the burst broadcast message such as the ABI.

Also, the base station may send system information related to the multi-carrier to the terminal via the unicast message in response to the terminal request or voluntarily.

In addition, when the base station determines, in the aspect of a load balancing, that the terminal performing the network entry procedure needs to change a primary carrier, the base station may indicate the primary carrier change to the terminal using a unicast message.

In this case, examples of the unicast messages, which are useable during the network entry, may include a ranging response message (RNG-RSP), a service basic capability response message (SBC-RSP), a registration response message (REG-RSP) and the like, and a separate unicast message may be defined and used after the network entry.

The system information transferred by the base station may include information related to whether or not the base station supports the multi-carrier operation, information related to the number of supportable carriers, index information related to each carrier, type information related to each carrier, center frequency information related to each carrier, bandwidth information related to each carrier and the like, which will be explained in detail later.

When the terminal receives the system information related to the base station-supportable multi-carriers from the base station through a broadcast message or the like, the terminal configures information regarding the carriers which the terminal is able to support or prefers in the multi-carrier list included in the system information, and sends the configured information to the base station through a unicast message (S403).

The information regarding the carriers, which the terminal is able to support or prefers, may be configured as an index value or in a bitmap form, which will be described in detail later.

Upon reception of the information regarding the carriers, which the terminal is able to support or prefers, from the terminal, the base station allocates a primary carrier and a secondary carrier, which the terminal will use, and sends the primary and secondary carriers to the terminal through a unicast message (S405).

Hereinafter, description will be given in detail of structures of multi-carrier related information and messages sent at each of the aforesaid steps with reference to FIG. 4.

Table 1 shows multi-carrier related system information broadcast by the base station.

Referring to Table 1, a network entry enabling information field indicates whether or not a terminal is able to perform the network entry to the base station via the current carrier. For a terminal that supports a single carrier and performs a network entry, if the bit of the field is disabled into 0, the terminal performs a process of searching for another frequency band. For a terminal that supports a multi-carrier, when the corresponding bit is disabled into 0, the terminal performs a process of searching for a carrier that the bit is enabled to 1 and allows performing of a network entry procedure, and performs the network entry as soon as finding the corresponding carrier.

An MC indication field indicates whether or not the base station supports a multi-carrier operation.

A number of MC field indicates the number of supported multi-carriers when the base station supports the multi-carrier operation.

Assuming that the number of supported multi-carriers is N, system information may be provided for each of the N carriers. The system information may include index information indicating the sequence of each carrier, carrier type information indicating whether the corresponding carrier is a fully configured carrier or a partially configured carrier, center frequency (CF) information related to each carrier, bandwidth information related to each carrier, network entry enabling information indicating whether or not the network entry is enabled using the corresponding carrier, and the like.

Table 2 shows an example that the CF information related to each carrier included in the system information of Table 1 is expressed as an relative value.

TABLE 1

| Name | Size (Bits) | Description |
|---|---|---|
| Broadcast system information { . . . | — | SFH, ABI or additional system information message |
| Network entry enabling | 1 | Indicating whether or not network entry to the base station via the current carrier is enabled |
| MC indication | 1 | 1: base station supports multi-carrier operations<br>0: base station does not support multi-carrier operations |
| If (MC indication==1) {<br>Number of MC<br>for (i=0; l<No. of MC; i++) { | — | The number of supportable carriers |
| Carrier index | — | Index of corresponding carrier |
| Type of carrier | 1 | Type of the corresponding carrier<br>0b0: fully configured carrier<br>0b1: partially configured carrier |
| Center frequency | — | Relative position of the corresponding carrier based on currently accessed carrier |

TABLE 1-continued

| Name | Size (Bits) | Description |
|---|---|---|
| Bandwidth | — | |
| Network entry enabling | 1 | Indicating whether or not network entry using the corresponding carrier is enabled<br>-partially configured carrier is set to 0 |
| . . .<br>}<br>} | | |

TABLE 2

| Name | Size (Bits) | Description |
|---|---|---|
| . . . | | |
| Center frequency | — | Relative position of the corresponding carrier based on currently accessed carrier<br>Unit: 2.5 MHz<br>Bit#3(MSB): indicating direction from the current carrier<br>0b0: indicating of being located at the front of (before: −) the currently accessed carrier<br>0b1: indicating of being located at the back of (after: +) the currently accessed carrier<br>Bit#0, #1, #2: indicating relative values (unit: 2.5 MHz)<br>0b0000: (−) 2.5 MHz<br>0b0001: (−) 5 MHz<br>0b0010: (−) 7.5 MHz<br>0b0011: (−) 10 MHz<br>0b0100: (−) 12.5 MHz<br>0b0101: (−) 15 MHz<br>. . .<br>0b1000: (+) 2.5 MHz<br>0b1001: (+) 5 MHz |

TABLE 2-continued

| Name | Size (Bits) | Description |
|------|-------------|-------------|
|      |             | 0b1010: (+) 7.5 MHz |
|      |             | 0b1011: (+) 10 MHz |
|      |             | ... |
| ...  |             |             |

Referring to Table 2, in case of existence of a plurality of carriers in the base station, the center frequency of each carrier may be expressed in the manner of indicating a relative position of each carrier based on a center frequency of a currently accessed carrier. A unit of a bit value indicating the relative position is 2.5 MHz.

One bit of bits expressing a relative value indicates a direction (e.g., before (front) (−) or after (back) (+)) based on the current position (MSB or LSB), and the other bits indicate a value moved (changed) as much as a set unit.

For example, if the center frequency of the current carrier is 2.450 GHz and a carrier A is located 10 MHz before the current carrier (i.e., 2.440 GHz), the center frequency information bit value of the carrier A is '0b0011' according to Table 2.

Thus, the position of each carrier is indicated by the relative value other than an absolute value, resulting in indicating the plurality of carriers only by less bit information.

The unit indicating the relative value may appropriately be selected according to system environments.

Table 3 shows an example that center frequency information related to each carrier included in the system information of Table 1 is expressed as a relative value in the unit of 5 MHz.

TABLE 3

| Name | Size (Bits) | Description |
|------|-------------|-------------|
| ... |   |   |
| Center frequency | — | Relative position of the corresponding carrier based on currently accessed carrier |
|   |   | Unit: 5 MHz |
|   |   | Bit#3(MSB): indicating direction from the current carrier |
|   |   | 0b0: indicating of being located at the front of (before: −) the currently accessed carrier |
|   |   | 0b1: indicating of being located at the back of (after: +) the currently accessed carrier |
|   |   | Bit#0, #1, #2: indicating relative value (unit: 5 MHz) |
|   |   | 0b0000: (−) 5 MHz |
|   |   | 0b0001: (−) 10 MHz |
|   |   | 0b0010: (−) 15 MHz |
|   |   | 0b0011: (−) 20 MHz |
|   |   | 0b0100: (−) 25 MHz |
|   |   | 0b0101: (−) 30 MHz |
|   |   | ... |
|   |   | 0b1000: (+) 5 MHz |
|   |   | 0b1001: (+) 10 MHz |
|   |   | 0b1010: (+) 15 MHz |
|   |   | 0b1011: (+) 20 MHz |
|   |   | ... |
| ... |   |   |

Figure 5:
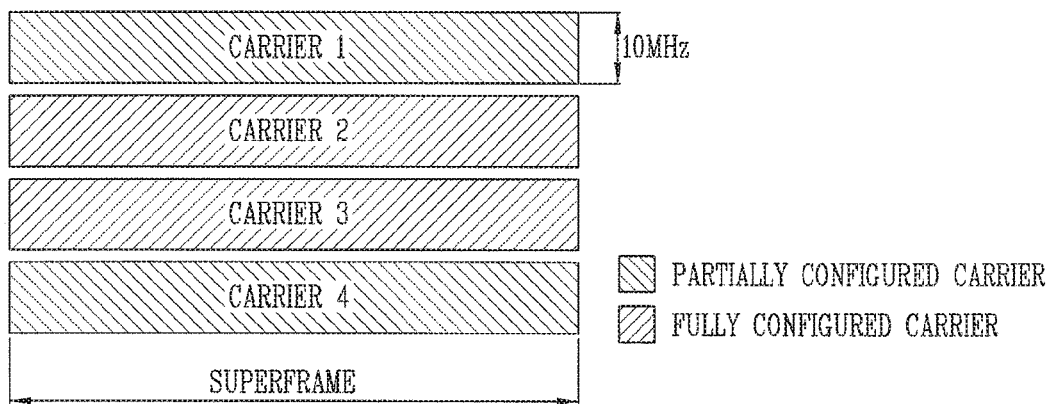
FIG. 5 is a view illustrating one exemplary embodiment of a frame structure supporting a multi-carrier.

FIG. 5 is a view illustrating an exemplary embodiment of a frame structure supporting a multi-carrier. If it is assumed that the bandwidth (BW) of all of the carriers (carrier 1, carrier 2, carrier 3 and carrier 4) is the same as 10 MHz, the center frequency (CF) of the carrier 1 is 2.45 GHz, the CF of the carrier 2 is 2.46 GHz, the CF of the carrier 3 is 2.47 GHz and the CF of the carrier 4 is 2.48 GHz, the relative CF information of the multi-carriers indicated in the system information transferred via the carrier 3 is described as follows.

Here, if it is assumed that the unit of the bit value indicating the relative position is 2.5 MHz, the CF of the carrier 1 is located 20 MHz before the CF of the current carrier (carrier 3), the CF of the carrier 2 is located 10 MHz before the CF of the current carrier (carrier 3), the CF of the carrier 4 is located 10 MHz after the CF of the current carrier (carrier 3), the size of the information bit indicating the CF is 5 bits, MSB indicates a direction, and the other 4 bits indicate a relative spaced gap value from the reference, the CF values of the respective carriers may be indicated as '0b00111' (CF of carrier 1), '0b00011' (CF of carrier 2) and '0b10011' (CF of carrier 4).

As illustrated with reference to FIG. 4, after receiving the basic system information related to the multi-carriers from the base station via the broadcast system information, the terminal sends information regarding whether or not it supports the multi-carrier operation and if so, informs the base station of carrier lists that it prefers in the multi-carrier list included in the system information. The terminal may send its own information regarding the multi-carriers to the base station through a unicast message, such as a ranging request message (RNG-REQ), a registration request message (REG-REQ), a multi-carrier request message, or the like.

Here, the carrier information transferred to the base station may be expressed by an index value or in a bitmap form.

Table 4 shows that the carrier information transferred from the terminal to the base station are expressed as index values.

TABLE 4

| Fields | Length | Notes |
|--------|--------|-------|
| No. of MC | — | The number of carriers (RF) that the terminal supports |
| Availability flag | 1 | 0: unable to use any |
|   |   | 1: able to use all |
| If (availability flag==0) { |   |   |
| No. of MC | 4 | The number of carriers that the terminal is able to use in the carrier lists of the base station |
| for (i=0; i<No. of MC; i++) { |   |   |
| Carrier index | 6 | Indexes of the carriers that are useable or preferred in the carrier index information of the base station |
| } |   |   |
| } |   |   |

Referring to Table 4, 'No. of MC' indicates the number of carriers that the terminal is able to support, and 'Availability flag' indicates whether or not the terminal is able to use all of the multi-carrier lists supported by the base station. If a bit value of 'Availability flag' is set to 0, it indicates that the terminal is unable to use any of the multi-carrier (MC) lists supported by the base station. If the bit value thereof is set to 1, it indicates that the terminal is able to use all of the multi-carrier (MC) lists supported by the base station.

If the terminal is unable to use any of the MC lists (i.e., if the bit value of 'Availability flag' is set to 0), the terminal informs of the number of multi-carriers that it is able to use.

Also, the terminal may inform of index information regarding each of the carriers that the terminal is able to use or prefers, and in some cases, transfer index information regarding non-useable carriers instead of the information regarding the useable carriers.

The index information may also be implemented in a manner of configuring a useable carrier combination for transmission.

Besides, the index information may be sent by further including information related to a frequency band that the terminal supports, maximum frequency band information and the like.

Table 5 shows that carrier information transferred from the terminal to the base station are expressed in a bitmap form.

TABLE 5

| Fields | Length | Notes |
|---|---|---|
| No. of MC | [4] | The number of carriers (RF) that the terminal supports |
| Availability flag | 1 | |
| If (availability flag==0) { | | |

TABLE 5-continued

| Fields | Length | Notes |
|---|---|---|
| Available carrier index bitmap | Variable | Indicating index information related to carriers that are useable and preferred, among the carrier index information of the base station, in a bitmap form. If bit is set to 1, it indicates that the corresponding carrier is useable. Size is the same as the number of supportable multi-carriers received via broadcast system information. |
| } | | |

Tables 4 and 5 have showed that one set of information related to the carriers that the terminal is able to use or prefers is sent to the base station as the index value or in the bitmap form. Alternatively, the terminal may inform the base station of one or more combinations related to the multi-carrier information that it can use.

Tables 6 and 7 show that the terminal combines corresponding available carrier information as many as the number of candidate carriers that the terminal itself is supportable and expresses the combinations in an index form (Table 6) or a bitmap form (Table 7).

TABLE 6

| Fields | Length | Notes |
|---|---|---|
| Availability flag | 1 | |
| If (availability flag==0) { | | |
| N_Candidate_sets | 2 | The number of candidates of Carrier combinations that the terminal is able to receive |
| for (i=0; i<N_Candidate_sets; i++) { | | |
| No. of MC | 4 | The number of carriers that the terminal is useable |
| for (i=0; i<No. of MC; i++) { | | |
| Carrier index | 6 | Indexes of carriers useable or preferred in the carrier index information of the base station |
| } | | |
| } | | |

TABLE 7

| Fields | Length | Notes |
|---|---|---|
| Availability flag | 1 | |
| If (availability flag==0) { | | |
| N_Candidate_sets | 2 | The number of candidates of Carrier combinations that the terminal is able to receive |
| for (i=0; i<N_Candidate_sets; i++) { | | |
| Available carrier index bitmap | variable | Indicating information related to combinations of carriers useable and preferred, among carrier index information of the base station. Each bit indicates physical carrier index allocated by the base station, and when the corresponding bit is set to 1, it indicates that the carrier is useable. Size is the same as the number of multi-carriers that the base station is able to support, received via broadcast system information. |
| } | | |
| } | | |

Figure 6:
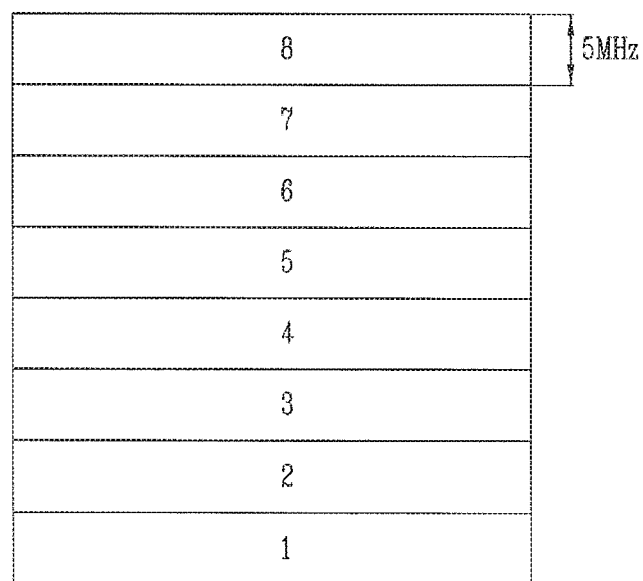
FIG. 6 is a view illustrating a structure of a multi-carrier frame including 8 consecutive carriers with 5 MHz bandwidth.

FIG. 6 illustrates a multi-carrier frame structure including eight consecutive carriers each having a bandwidth of 5 MHz. If the terminal is able to use four consecutive 5 MHz bandwidth carriers from carrier 1 to carrier 4, the terminal may inform the base station of information regarding carriers, which the terminal prefers or is able to support, by use of a unicast message.

Here, when the terminal transfers the carrier information using the index method, the terminal configures each index (Index 1, 2, 3 and 4) of each multi-carrier as 'carrier index' field to send to the base station. When the terminal transfers the carrier information using the bitmap method, the terminal sets the bitmap of 'Available carrier index bitmap' field to '00001111 to send to the base station.

Figure 7:
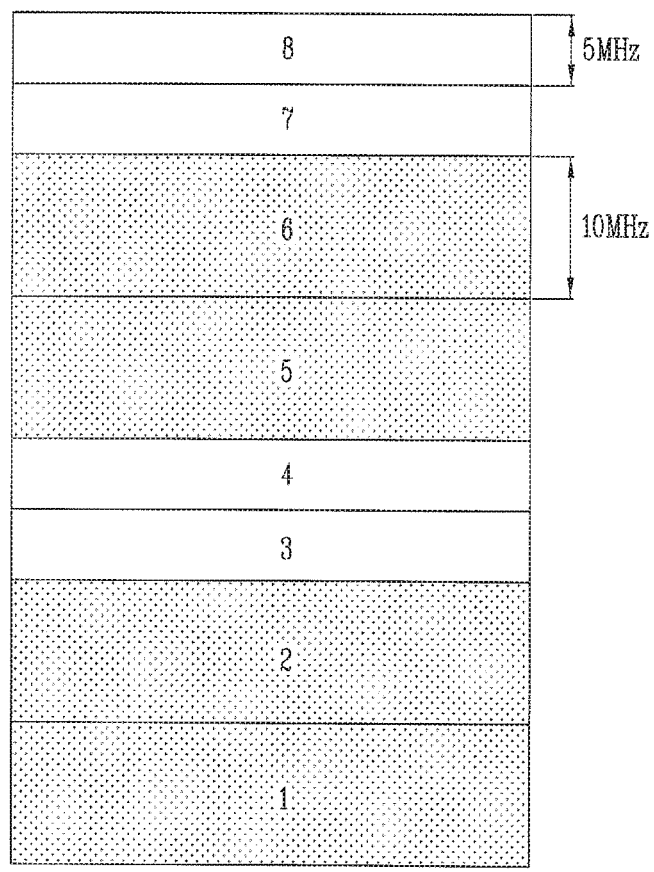
FIG. 7 is a view illustrating a structure of a multi-carrier frame including eight consecutive carriers with 5 MHz and 10 MHz bandwidths.

FIG. 7 illustrates a multi-carrier frame structure including 8 carriers with bandwidths of 5 MHz and 10 MHz. When the base station supporting the multi-carrier supports totally 8 carriers including 4 carriers each having 10 MHz size and 4 carriers each having 5 MHz size, if the terminal is able to support the multi-carriers at 20 MHz band, the following carrier combinations may be configured.

Combination 1: consecutive 25 MHz carriers (10 MHz carrier1+10 MHz carrier2+5 MHz carrier3)

Combination 2: separate 10 MHz carriers and 15 MHz carrier (10 MHz carrier1+5 MHz carrier4+10 MHz carrier5)

Here, if the terminal informs the base station of its available carrier information by the bitmap method, the bitmap for each combination may be set as follows.

Combination 1: 00000111

Combination 2: 00011001

As aforementioned with reference to FIG. 4, after receiving the carrier list that the terminal is able to support or prefers in the form of the unicast message, the base station uses the received carrier list to select a primary carrier and a secondary carrier, which the terminal will use, so as to send to the terminal. The base station may send the carrier allocation information to the terminal via a unicast message, such as RNG-RSP, SBC-RSP, REG-RSP or the like.

The allocated carrier information may be expressed as an index value (Table 8) or in a bitmap form (Table 9).

Table 8 shows that the allocated carrier information is expressed as the index value.

TABLE 8

| Fields | Length | Notes |
| --- | --- | --- |
| Primary carrier index | — | Primary carrier index information |
| No. of SC | — | The number of secondary carriers |
| for (i=0; i<No. of SC; i++) { | | |
| Secondary carrier index } | — | Secondary carrier index information |

Table 9 shows that the allocated carrier information is expressed in the bitmap form.

TABLE 9

| Fields | Length | Notes |
| --- | --- | --- |
| Primary carrier index | — | Primary carrier index information |
| Secondary carrier index bitmap | — | The base station indicates secondary carrier index information in a bitmap form. The corresponding carrier having a bit set to 1 is set to secondary carrier in the terminal |

As such, upon receiving the primary and secondary carrier allocation information from the base station, the terminal completes the network entry procedure or carries out a data transmission/reception with the base station via the corresponding carriers.

The method having described so far may be implemented by software, hardware or combination thereof. For example, the method may be stored in a storage medium (for example, an internal memory of a terminal, a flash memory, a hard disc, etc.), and implemented as codes or commands within a software program, which may be executed by a processor (for example, a microprocessor within the terminal).

The foregoing embodiments and advantages are merely illustrative and thus should not be construed as limiting the present disclosure. Many alternatives, modifications or variations will be derived from the exemplary embodiments within the scope and the claims of the present disclosure.

What is claimed is:

1. A method for operating a plurality of carriers by a first base station in a wireless communication system supporting a primary carrier and at least one secondary carrier, the method comprising:

receiving, from a user equipment, carrier capability information including information on a bandwidth combination set supported by the user equipment;

transmitting, to the user equipment, carrier configuration information, wherein the carrier configuration information includes at least one index corresponding respectively to the at least one secondary carrier configured for the user equipment, wherein the carrier configuration information is generated based on the carrier capability information of the user equipment, and wherein the primary carrier is configured as a carrier for performing an initial network entry procedure;

transmitting, to the user equipment through the primary carrier, control information for exchanging traffic via the at least one secondary carrier with the user equipment;

transmitting, to the user equipment, the traffic through the secondary carrier, wherein the user equipment is configured to receive the traffic based on the control information; and transmitting, to the user equipment, a message for a procedure of an entrance to a second base station, wherein the primary carrier is changed on the procedure of the entrance based on the message, and wherein the information on the bandwidth combination set indicates bands applicable to the wireless communication in a bitmap form.

2. The method of claim 1, wherein, when each bit value of the information on the bandwidth combination set is one, a corresponding bandwidth is applicable and when each bit value of the information on bandwidth combination set is zero, the corresponding bandwidth is not applicable.

3. The method of claim 1, wherein information related to a number of carriers supported by the user equipment is obtained based on the carrier capability information.

4. A base station for operating a plurality of carriers in a wireless communication system supporting a primary carrier and at least one secondary carrier, the base station comprising:

a transceiver coupled to a processor; and the processor configured to:

receive, from a user equipment, carrier capability information including information on a bandwidth combination set supported by the user equipment, transmit, to the user equipment, carrier configuration information, wherein the carrier configuration information includes at least one index corresponding respectively to the at least one secondary carrier configured for the user equipment, wherein the carrier configuration information is generated based on the carrier capability information of the user equipment, and wherein the primary carrier is configured as a carrier for performing an initial network entry procedure, transmit, to the user equipment through the primary carrier, control information for exchanging traffic via the at least one secondary carrier with the user equipment;

transmit, to the user equipment, the traffic through the secondary carrier, wherein the user equipment is configured to receive the traffic based on the control information; and transmit, to the user equipment, a message for a procedure of an entrance to a second base station, wherein the primary carrier is changed on the procedure of the entrance based on the message, and wherein the information on the bandwidth combination set indicates bands applicable to the wireless communication in a bitmap form.

5. The base station of claim 4, wherein, when each bit value of the information on the bandwidth combination set is one, a corresponding bandwidth is applicable and when each bit value of the information on bandwidth combination set is zero, the corresponding bandwidth is not applicable.

6. The base station of claim 4, wherein information related to a number of carriers supported by the user equipment is obtained based on the carrier capability information.

7. A method for operating a plurality of carriers by a user equipment in a wireless communication system supporting a primary carrier and at least one secondary carrier, the method comprising:

transmitting, to a first base station, carrier capability information including information on a bandwidth combination set supported by the user equipment;

receiving, from the first base station, carrier configuration information, wherein the carrier configuration information includes at least one index corresponding respectively to the at least one secondary carrier configured for the user equipment, wherein the carrier configuration information is generated based on the carrier capability information of the user equipment, and wherein the primary carrier is configured as a carrier for performing an initial network entry procedure;

receiving, from the first base station through the primary carrier, control information for exchanging traffic via the at least one secondary carrier with the first base station;

receiving, from the first base station, the traffic through the secondary carrier, based on the control information; and receiving, from the first base station, a message for a procedure of an entrance to a second base station, wherein the primary carrier is changed on the procedure of the entrance based on the message, and wherein the information on the bandwidth combination set indicates bands applicable to the wireless communication in a bitmap form.

8. The method of claim 7, wherein, when each bit value of the information on the bandwidth combination set is one, a corresponding bandwidth is applicable and when each bit value of the information on bandwidth combination set is zero, the corresponding bandwidth is not applicable.

9. The method of claim 7, wherein information related to a number of carriers supported by the user equipment is obtained based on the carrier capability information.

10. A user equipment for operating a plurality of carriers in a wireless communication system supporting a primary carrier and at least one secondary carrier, the user equipment comprising:

a transceiver coupled to a processor; and the processor configured to:

transmit, to a first base station, carrier capability information including information on a bandwidth combination set supported by the user equipment, receive, from the first base station, carrier configuration information, wherein the carrier configuration information includes at least one index corresponding respectively to the at least one secondary carrier configured for the user equipment, wherein the carrier configuration information is generated based on the carrier capability information of the user equipment, and wherein the primary carrier is configured as a carrier for performing an initial network entry procedure, receive, from the first base station through the primary carrier, control information for exchanging traffic via the at least one secondary carrier with the first base station;

receive, from the first base station, the traffic through the secondary carrier, based on the control information; and receive, from the first base station, a message for a procedure of an entrance to a second base station, wherein the primary carrier is changed on the procedure of the entrance based on the message, and wherein the information on the bandwidth combination set indicates bands applicable to the wireless communication in a bitmap form.

11. The user equipment of claim 10, wherein, when each bit value of the information on the bandwidth combination set is one, a corresponding bandwidth is applicable and when each bit value of the information on bandwidth combination set is zero, the corresponding bandwidth is not applicable.

12. The user equipment of claim 10, wherein information related to a number of carriers supported by the user equipment is obtained based on the carrier capability information.

* * * * *